United States Patent Office 3,434,852
Patented Mar. 25, 1969

3,434,852
PLASTICIZED SULFUR COMPOSITIONS
Rector P. Louthan, Bartlesville, Okla., assignor to Phillips Petroleum Company, a corporation of Delaware
No Drawing. Filed Sept. 20, 1965, Ser. No. 488,723
Int. Cl. C09k 1/00; C09d 5/00
U.S. Cl. 106—19       9 Claims

ABSTRACT OF THE DISCLOSURE

Plasticizer sulfur compositions possessing desirable properties are produced by the reaction of 3 to 30 parts by weight of a polythiol per 100 parts by weight of sulfur. In addition sulfur based marking compositions possessing a high degree of whiteness and having good impact strength are prepared by the use of a white extender pigment and a halogenated polyphenyl in conjunction with the plasticized sulfur.

---

This invention relates to plasticized sulfur compositions. In one aspect of this invention relates to novel compositions containing plasticized sulfur.

In a further aspect this invention relates to novel compositions of plasticized sulfur which are suitable for use as road-marker materials.

Unmodified elemental sulfur is known to be moldable, but the low tensile strength and brittleness of the resulting product render it unsuitable for many purposes. Thus many plasticized sulfur compositions have been prepared in an effort to modify the elemental sulfur, but often the sulfur becomes chemically incorporated into the organic polymer produced. It is highly desirable of modified sulfur compositions to possess a high tensile strength and a high hardness while containing a portion of the sulfur in an elemental form.

In addition, compositions containing plasticized sulfur have been proposed for use as road-marker materials. However, such compositions are yellow unless suitably pigmented. The production of white, or nearly white, plasticized sulfur compositions requires that some substance be added to mask the natural yellow color. Furthermore, if the whitened composition is used as a marking composition, e.g., in the marking of highways, streets, roads, airport landing strips, and the like, it is important that the mark produced be of sufficiently high impact strength.

It is thus an object of this invention to provide novel compositions of plasticized sulfur.

Another object of this invention is to provide a plasticized sulfur composition of increased tensile strength wherein a major portion of the sulfur remains in the elemental form.

A still further object of this invention is to provide a plasticized sulfur marking composition having a combination of desired whiteness and impact strength.

Other aspects, objects and the several advantages of this invention are apparent from a study of the disclosure and the appended claims.

In accordance with my invention, plasticized sulfur compositions possessing desirable properties are produced by the reaction of certain polythiols with elemental sulfur in the presence of a basic catalyst. Applicable polythiols are those having the formula $Y(SH)_n$, where $n$ is an integer selected from the group consisting of 2, 3, and 4, preferably 2 or 3, and Y is a radical having a valence of $n$ and containing 2–30, preferably 2–20, carbon atoms, each of said carbon atoms preferably having attached thereto not more than one SH group, said radical Y being selected from the group consisting of (A) radicals containing carbon and hydrogen only, (B) radicals containing carbon, hydrogen, and oxygen only, and (C) radicals containing carbon, hydrogen, and sulfur only, the sulfur being present as monosulfide linkages. Radicals containing carbon and hydrogen only include saturated aliphatic, unsaturated aliphatic, saturated cycloaliphatic, unsaturated cycloaliphatic, and aromatic radicals, and combinations thereof. Radicals containing carbon, hydrogen, and oxygen only include saturated aliphatic, unsaturated aliphatic, saturated cycloaliphatic, and unsaturated cycloaliphatic radicals and aromatic radicals, and combinations thereof, possessing hydroxy, ester, aldehydic, or ketonic substituents, or ether linkages, the total number of said substituents and linkages preferably not exceeding two. Radicals containing carbon, hydrogen, and sulfur only, the sulfur being present as sulfide linkages, include saturated and unsaturated hydrycarbyl radicals in which one or more methylene groups not adjacent to the thiol groups in the molecule are replaced by monosulfide linkages, said monosulfide linkages being separated by at least one carbon atom when more than one monosulfide linkage is present, and the number of said monosulfide linkages preferably not exceeding 10. Such compositions are distinguishable over those heretofore known in the art in that the polythiol is free from polysulfide linkages and the major portion of the sulfur remains in elemental form rather than being chemically bonded within the organic polymer molecule.

Further, in accordance with my invention, the plasticized sulfur compositions of this invention possess even more desirable properties if prepared through use of a trithiol or tetrathiol, preferably a trithiol, in combination with a dithiol. The use of a mixture of a dithiol and a trithiol or tetrathiol results in plasticized sulfur compositions whose properties are quite different than would be expected on the basis of the properties of compositions prepared through use of the polythiols individually.

I have further discovered that sulfur-based marking compositions possessing a high degree of whiteness and having good impact strength are prepared by the use of a white extender pigment and a halogenated polyphenyl in conjunction with sulfur plasticized with at least one dithiol selected from the group consisting of 3-(2-mercaptoethyl)cyclohexanethiol and 4-(2-mercaptoethyl)cyclohexanethiol. The white extender pigment whitens the plasticized sulfur, which already is substantially whiter than elemental sulfur or sulfur plasticized with polythiols generally, and imparts higher impact strength to the plasticized composition. The halogenated polyphenyl serves to decrease the viscosity of the molten composition to a level suitable for direct application as a spray. The dithiols named above as plasticizers are unique in making possible the production of marking compositions of high impact strength which are whiter than those produced in a similar manner when other polythiols are used in the plasticization.

Examples of some polythiols that can be used in the preparation of the compositions of one aspect of this invention are those selected from the group consisting of 1,2-ethanedithiol,
1,2-propanedithiol,
1,3-propanedithiol,
1,2,3-propanetrithiol,
1,2-butanedithiol,
2-methyl-1,2-propanedithiol,
1,4-butanedithiol,
1,2,4-butanetrithiol,
1,2,3,4-butanetetrathiol,
1,2,3-pentanetrithiol,
1,6-hexanedithiol,
3-methyl-2,3-heptanedithiol,
1,2,10-decanetrithiol,
2-methyl-1,14-tetradecanedithiol, 1,20-eicosanedithiol,
1,30-triacontanedithiol,
3-butene-1,2-dithiol,
2-butene-1,4-dithiol,
2-methyl-3-hexene-1,2,5,6-tetrathiol,
3,6-octadiene-1,2,8-trithiol,
3-hexyne-1,6-dithiol,
1,2-cyclohexanedithiol,
3-(2-mercaptoethyl)cyclohexanethiol,
4-methyl-1,2,3-cyclopentanetrithiol,
1-cyclopentyl-1,2-ethanedithiol,
4-cyclohexene-1,2-dithiol,
2,5-cyclohexadiene-1,4-dithiol,
5-cyclooctyne-1,2-dithiol,
4-methyl-3-cyclopentene-1,2-dithiol,
1,4-benzenedithiol,
1,2,4-benzenethrithiol,
1,2,4,5-benzenetetrathiol,
toluene-2,4-dithiol,
toluene-α-4-dithiol,
1,4-naphthalenedithiol,
4-hydroxy-1,2,3-butanetrithiol,
3-acetoxy-1,2-propanedithiol,
2-formyl-1,2-ethanethiol,
3-acetyl-1,2-propanedithiol,
bis(2-mercaptoethyl)ether,
bis(3-mercaptropropyl)ether,
1,2-bis,2-mercaptoethoxy)ethane,
2,3-dihydroxy-1,4-butanedithiol,
1,4-dimethoxy-2,3-butanedithiol,
5-hydroxy-3-pentene-1,2-dithiol,
6-propionyloxy-3-hexene-1,2-dithiol,
4-formyl-3-butene-1,2-dithiol,
4-propionyl-3-butene-1,2-dithiol,
bis(3-mercaptopropenyl)ether,
3-hydroxy-4-cyclohexene-1,2-dithiol,
4-methyl-5-acetoxy-3-cyclopentene-1,2-dithiol,
6-formyl-2-cyclohexene-1,4-dithiol,
5-acetyl-3-cyclohexene-1,2-dithiol,
bis(4-mercapto-2-cyclopenten-1-yl)ether,
3-hydroxy-1,2-benzenedithiol,
5-acetoxy-1,2,4-benzenetrithiol,
4-formyl-1,2-benzenedithiol,
2-acetyl-1,4-benzenedithiol,
4-ethoxy-1,2-benzenedithiol,
4,5-dihydroxy-1,2-benzenedithiol,
2-methoxy-5-acetyl-1,4-benzenedithiol,
bis(2-mercaptoethyl)sulfide,
bis(3-mercaptopropyl)sulfide,
2-mercaptoethyl-2,3-dimercaptopropyl sulfide,
bis(2,3-dimercaptopropyl)sulfide,
4-mercaptobutyl-5-mercaptopentyl sulfide,
3,5-dithiaheptane-1,7-dithiol,
3,6,9-trithiaundecane-1,11-dithiol,
4,8,12,16-tetrathianonadecane-1,19-dithiol,
5,10,15,20-tetrathiatetracosane-1,24-dithiol,
3,6,9,12,15,18,21,24,27,30-decathiadotriacontane-1,32-dithiol,
4,8,12,16,20,24,28,32,36-nonathianonatriacontane-1,39-dithiol,
bis(4-mercapto-2-butenyl)sulfide,
2-mercaptoethyl 4-mercaptocyclohexyl sulfide,
bis(3-mercaptocyclopentyl)sulfide,
bis(4-mercapto-2-cyclohexen-1-yl)sulfide,
bis(4-mercaptophenyl)sulfide,
bis(2-mercapto-p-tolyl)sulfide, and
1,4-bis(4-mercaptophenylthio)benzene.

Any basic catalyst can be employed in the preparation of the plasticized compositions of this invention. The preferred catalysts are amines, ammonia, and the oxides, hydroxides, and carbonates of lithium, sodium, potassium, rubidium, cesium, magnesium, calcium, strontium, and barium. The amines can be primary, secondary, or tertiary, and they can contain saturated or unsaturated aliphatic or cycloaliphatic groups or aromatic groups, or combinations thereof, in the molecule. Heterocyclic amines are included among the applicable amines. The amines most generally perferred are the saturated aliphatic amines having 3–20 carbon atoms. Some examples of amines of this type are propylamine, trimethylamine, N-methylethylamine, isobutylamine, hexylamine, octylamine, diphenylamine, triproplamine, tributylamine, diheptylamine, and N,N,-dihexyloctylamine. Amines and ammonia are particularly useful catalysts when a rapid reaction between the polythiol and sulfur is desired. On the other hand, calcium carbonate is a cheap and especially useful catalyst when it is desirable or necessary that the composition be maintained at an elevated temperature for a prolonged period of time.

In the preparation of the compositions of this invention, the ratio of polythiol to sulfur will usually be in the range of 3–30 parts by weight of polythiol to 100 parts by weight of sulfur, preferably in the range of 5–20 parts by weight of polythiol to 100 parts by weight of sulfur. The concentration of basic catalyst is not critical, but the catalyst is perferably employed in an amount equivalent to 0.01–5 parts by weight per 100 parts by weight of sulfur.

Although any of the polythiols can be used in combination, it is often especially advantageous, as mentioned above, to employ both a dithiol and a trithiol or tetrathiol in the preparation of the plasticized sulfur compositions. The dithiol and tri- or tetrathiol can be employed over a wide range of ratios; however, the ratio of dithiol to tri- or tetrathiol should usually be in the range of 1:9 to 9:1, and will most often be in the range of 1:4 to 4:1, depending on the nature of the polythiols and on the properties desired in the plasticized sulfur compositions.

Although the plasticized sulfur compositions are preferably prepared in the absence of added solvent, suitable solvents such as chloroform, carbon tetrachloride, benzene, toluene, and xylene can be used. The reaction temperature is generally maintained within the range of about −20 to 250° C., preferably within the range of about 20 to 200° C. The reaction period varies, depending on the temperature and on the nature and concentration of the components in the reaction system, but should be in the range of about 1 minute to about 2 days, usually being within the range of about 3 mintues to about 4 hours. The pressure need be only sufficient to maintain the polythiols and solvent, if used, substantially in the liquid phase. Hydrogen sulfide, which is evolved during the reaction, can be removed as it is formed. If a solvent is used, the solvent can be removed by volatilization upon completion of the reaction.

The compositions of this invention can be readily molded or cast to give materials which, in general, possess higher tensile strength and lower hardness than do those obtained from sulfur alone, thus fulfilling certain requirements not met by sulfur in an unmodified form. For example, the compositions of this invention can be used in the building industry as coatings and binders for strengthening and weatherproofing walls made of concrete blocks or other building materials. The compositions can also be mixed with appropriate aggregates, or blended with asphalt, for use as a highway surfacing material. As the compositions have good impact strength, they are especially useful as highway marking paints, the compositions being applied in molten form to give a mark which quickly hardens and provides long service. The compositions, of course, can also be used in paints designed for other purposes.

To increase the tensile and impact strength of the compositions of this invention, reinforcing agents such as fibers of glass, metal, or other material can be incorporated into the compositions.

As stated above, plasticization of the sulfur to form the marking compositions of one aspect of this invention is carried out through the use of 3-(2-mercaptoethyl)-cyclohexanethiol or 4-(2-mercaptoethyl)cyclohexanethiol, used singly or in combination. These dithiols can be readily prepared, e.g., by the method disclosed in U.S. 3,050,452. Furthermore, it is not necessary to remove higher-boiling substances, e.g., sulfides, that are normally present, as the crude mixture of isomeric dithiols contaminated with higher-boiling substances is quite suitable, thus permitting the plasticizer to be obtained at low cost.

Preferably, the sulfur is first plasticized, and the white extender pigment and halogenated polyphenyl are then added, either at the same time or either one followed by the other. Thorough mixing of the extender pigment and halogenated polyphenyl with the plasticized sulfur is readily achieved by stirring at a temperature at which the plasticized sulfur is molten. Less preferably, the pigment and/or halogenated polyphenyl can be added to the sulfur and/or to the plasticizer prior to plasticization of the sulfur.

White extender pigments suitable for use in this aspect of the invention are those pigments selected from the group consisting of calcium carbonate, calcium sulfate, magnesium silicate, magnesium carbonate, magnesium oxide, china clay, pyrophlyllite, mica, pumice, bentonite, silica, diatomite, barium sulfate, barium carbonate, alumina hydrate, and calcium silicate.

Halogenated polyphenyls which can be used in the process of this invention include halogenated biphenyl, halogenated o-terphenyl, halogenated m-terphenyl, and halogenated p-terphenyl. Mixtures of these halogenated polyphenyls, of course, can be used. The halogenated biphenyl can have 1–10 halogen atoms per molecule, and each of the halogenated terphenyls can have 1–14 halogen atoms per molecule. Although the halogen in the halogenated biphenyl and halogenated terphenyls can be fluorine, chlorine, bromine, or iodine, it is preferable that the halogen be chlorine. Particularly useful halogenated biphenyl and halogenated terphenyls are the chlorinated biphenyl and chlorinated terphenyls (Aroclors) available from Monsanto Co.

Unexpectedly, plasticization of sulfur by the mercaptoethylcyclohexanethiols used in this invention requires no catalyst. However, basic catalysts such as amines, ammonia, and the oxides, hydroxides, and carbonates of lithium, sodium, potassium, rubidium, cesium, magnesium, calcium, strontium, and barium can be used, e.g., in amounts up to about 5 weight percent of the sulfur employed, if an accelerated reaction is desired. Although solvents such as chloroform, carbon tetrachloride, benzene, toluene, and xylene can be present during the plasticization, it is preferred that they not be used.

The ratio of mercaptoethylcyclohexanethiols to sulfur can vary within a broad range, but will usually be within the range of about 3–30 parts by weight of dithiol to 100 parts by weight of sulfur, preferably within the range of about 5–20 parts by weight of dithiol to 100 parts by weight of sulfur. The temperature at which the plasticization is carried out is generally maintained within the range of about 50–250° C., preferably within the range of about 100–200° C. The time required for the plasticization varies depending on the temperature and on the nature and concentration of the components in the system, but should be within the range of about 5 minutes to about 2 days, usually being within the range of about 10 minutes to about 6 hours.

As stated above, the white extender pigment and halogenated polyphenyl are preferably added to the plasticized sulfur, mixing being achieved by stirring or otherwise agitating the pigmented molten mixture. The ratio of pigment to plasticized sulfur should be within the range of about 1–50 parts by weight of pigment to 100 parts by weight of plasticized sulfur, preferably being within the range of about 3–20 parts by weight of pigment to 100 parts by weight of plasticized sulfur. The ratio of halogenated polyphenyl to plasticized sulfur should be within the range of about 1–50 parts by weight of halogenated polyphenyl to 100 parts by weight of plasticized sulfur, preferably being within the range of about 3–20 parts by weight of halogenated polyphenyl to 100 parts by weight of plasticized sulfur. In general, the use of equal amounts, by weight, of pigment and halogenated polyphenyl gives a suitable product.

The sulfur-based marking compositions of this invention are of sufficient whiteness and impact strength to make them ideally suitable as white marking compositions, e.g., in the marking of highways, streets, roads, airport landing strips, and the like. Of course, other materials such as sand, glass beads, and the like can be added to impart special properties sometimes desired in marking compositions.

The following examples are presented to further illustrate the invention.

EXAMPLE I

A series of plasticized sulfur compositions was prepared by adding 4, 10, 15, or 20 parts by weight of a polythiol containing 0.1 part by weight of tributylamine to 100 parts by weight of molten sulfur at 135° C. over a period of about 5 minutes, during which time hydrogen sulfide was liberated from the mixtures. The mixtures were maintained at about 135° C. for an additional 15 minutes and then compression molded at 24,000 p.s.i. and about 100° C., in a Carver press, into 4⅞ in. x ½ in. x ⅛ in. test bars. The tensile strength of the test bars was determined with an Instron tensile machine, utilizing a gauge length of 2 in. and a pulling rate of 0.2 in./min. The Shore "D" hardness was determined with a Shore durometer. The results of these tests, together with those of similar tests made on bars molded from sulfur alone, are shown in Table I.

TABLE I

| Polythiol Reactant | Polythiol, Parts per 100 Parts Sulfur, by Weight | Tensile Strength, p.s.i. | Shore "D" Hardness [a] |
|---|---|---|---|
| None | | 65 | 80 |
| 1,2-ethanedithiol | 10 | 420 | 66 |
| Do | 15 | 310 | 55 |
| 1,2-propanedithiol | 5 | 200 | 68 |
| Do | 10 | 142 | 62 |
| Do | 15 | 303 | 58 |
| Do | 20 | 239 | 49 |
| 1,2,3-propanetrithiol | 10 | 730 | 90 |
| 1,6-hexanedithiol | 10 | | 41 |
| (3 or 4) (2-mercaptoethyl)cyclohexanethiol [b] | 10 | 109 | 67 |
| Bis(3-mercaptopropyl) ether | 10 | 88 | 41 |
| Polythiaalkane-α,ω-dithiols [c] | 10 | 234 | |

[a] ASTM D1706–61. Shore durometer, type D.
[b] Prepared by the method of Example I in U.S. 3,050,452.
[c] A mixture of 331.5 g. of 3-chloro-1-propanethiol, 360 g. of sodium sulfide nonahydrate, 120 g. of sodium hydroxide, and 1,257 ml. of water was stirred in an autoclave at 150° C. for 30 minutes. The reaction product was acidified with 300 ml. of concentrated hydrochloric acid and then extracted with benzene. The benzene extract was washed with water, after which the benzene was distilled. The residue was then heated to 250° C. at less than 1 mm., leaving in the distillation flask a mixture of crude polythiaalkane-α,ω-dithiols having an average molecular weight of 545 and a mercaptan sulfur content of 10.3 weight percent. This mixture of crude dithiols was used without further purification.

Thus, plasticization of the sulfur by the action of polythiols in the presence of a catalytic amount of tributylamine gave compositions which on molding were generally of higher tensile strength and lower hardness than was molded sulfur alone.

EXAMPLE II

Another series of plasticized sulfur compositions was prepared by adding 10 parts by weight of a polythiol, at one time, to a molten slurry of 2.5 parts by weight of calcium carbonate in 100 parts by weight of sulfur at 170° C., at which temperature the mixtures were maintained for 30 minutes. Hydrogen sulfide was liberated during this reaction period. The reaction mixtures were then molded into test bars, as in Example I, and the tensile strength and hardness were determined as described in Example I. The results of these tests, together with those of similar tests made on bars molded from sulfur alone, are shown in Table II.

TABLE II

| Polythiol Reactant | Tensile Strength, p.s.i. | Shore "D" Hardness [a] |
| --- | --- | --- |
| None | 65 | 80 |
| 1,2-ethanedithiol | 64 | 66 |
| 1,2-propanedithiol | 289 | 71 |
| 3(and 4)-(2-mercaptoethyl)cyclohexanethiol | 351 | 59 |
| Bis(3-mercaptopropyl) ether | 131 | 40 |

[a] ASTM D1706-61. Shore durometer, type D.

Thus, plasticization of the sulfur by the action of polythiols in the presence of a catalytic amount of calcium carbonate gave compositions which on molding were generally of higher tensile strength and lower hardness than was molded sulfur alone.

EXAMPLE III

A series of plasticized sulfur compositions was prepared by adding 10 parts by weight of various mixtures of 1,2-ethanedithiol and 1,2,3-propanetrithiol containing 0.1 part by weight of tributylamine to 100 parts by weight of molten sulfur at 135° C. over a period of about 5 minutes. Hydrogen sulfide was liberated during the addition. The mixtures were maintained at about 135° C. for an additional 15 minutes and then molded into test bars, as in Example I. The tensile strength and hardness of the test bars were determined as described in Example I. The results of these tests are shown in Table III. For comparison purposes there are included the tensile strength and hardness of test bars prepared in the same manner as those above except that 10 parts by weight of the dithiol or 10 parts by weight of the trithiol was substituted for the 10 parts by weight of the mixture of dithiol and trithiol.

TABLE III

[Basis: 100 parts sulfur; 0.1 part tributylamine]

| 1,2-ethanedithiol, Parts by Weight | 1,2,3-propanetrithiol, Parts by Weight | Tensile Strength, p.s.i. | Shore "D" Hardness [a] |
| --- | --- | --- | --- |
| 10.0 | 0 | 420 | 66 |
| 6.7 | 3.3 | 725 | 76 |
| 5.0 | 5.0 | 1,390 | 86 |
| 3.3 | 6.7 | 1,910 | 80 |
| 2.0 | 8.0 | 1,112 | 84 |
| 1.0 | 9.0 | 1,092 | 84 |
| 0 | 10.0 | 730 | 90 |

[a] ASTM D1706-61. Shore durometer, type D.

Thus, the tensile strength of the compositions prepared through use of mixtures of the dithiol and trithiol was much higher than would have been expected on the basis of the tensile strength of the compositions prepared through use of each polythiol individually, and the hardness remained at an acceptable level.

Into a plasticized composition the same as that having a tensile strength of 1390 p.s.i., as shown in Table III, was incorporated 3.5 parts of 0.5-in. standard reinforcing glass fibers per 100 parts of sulfur used in preparing the plasticized composition. The resulting reinforced plasticized composition had a tensile strength of 2975 p.s.i.

EXAMPLE IV

A series of plasticized sulfur compositions was prepared by adding a mixture of 5 parts by weight of a dithiol, 5 parts by weight of 1,2,3-propanetrithiol, and 0.1 part by weight of tributylamine to 100 parts by weight of molten sulfur at 135° C. over a period of about 5 minutes, during which time hydrogen sulfide was liberated from the mixtures. The mixtures were maintained at about 135° C. for an additional 15 minutes and then molded into test bars, as in Example I. The tensile strength and hardness of the test bars were determined as described in Example I. The results of these tests are shown in Table IV. For purposes of comparison there are included the tensile strength and hardness of test bars prepared in the same manner as those above except that 10 parts by weight of the dithiol was substituted for the mixture of 5 parts by weight of dithiol and 5 parts by weight of 1,2,3-propanetrithiol. When 10 parts by weight of 1,2,3-propanetrithiol was substituted for the mixture of 5 parts by weight of the dithiol and 5 parts by weight of the trithiol, the tensile strength and Shore "D" hardness of the molded test bars were 730 p.s.i. and 90, respectively.

TABLE IV

| Dithiol Component | With Propanetrithiol | | Without Propanetrithiol | |
| --- | --- | --- | --- | --- |
| | Tensile Strength, p.s.i. | Shore "D" Hardness [a] | Tensile Strength, p.s.i. | Shore "D" Hardness [a] |
| 1,2-propanedithiol | 620 | 80 | 142 | 62 |
| 1,6-hexanedithiol | 379 | 78 |  | 41 |
| 3(and 4)-(2-mercaptoethyl)-cyclohexanethiol | 895 | 82 | 109 | 67 |
| Bis(3-mercaptopropyl) ether | 370 | 78 | 88 | 41 |

[a] ASTM D1706-61. Shore durometer, Type D.

Thus, the tensile strength of the compositions prepared through use of a mixture of the trithiol with 1,2-propanedithiol and with 3(and 4)-(2 - mercaptoethyl)cyclohexanethiol was much higher than would have been expected on the basis of the tensile strength of the compositions prepared through use of each polythiol individually. On a similar basis, the hardness of each of the compositions prepared through use of a mixture of polythiols, especialy when one of the polythiols was 1,6-hexanedithiol or bis (3-mercaptopropyl)ether, was higher than would have been expected.

EXAMPLE V

In a series of experiments 922.6–930 g. of sulfur and 5.0 g. of calcium carbonate were dry-blended for a few minutes in a Readco blender, after which a liquid dithiol was added to each of the blends over a period of about 5 minutes. The mixtures were then blended for an additional period of about 25 minutes. As pigmented sulfur compositions plasticized with a combination of an aliphatic polysulfide and a styrene polysulfide have been reported to be effective highway marking material, a control experiment was carried out in which 895 g. of sulfur, 50 g. of styrene polysulfide, and 5.0 g. of calcium carbonate were dry-blended for a few minutes in a Readco blender, after which 50 g. of aliphatic polysulfide (a liquid) was added to the blend over a period of about 5 minutes. The mixture was then blended for an additional period of about 25 minutes. With 1,2-ethanedithiol, or 1,2-propanedithiol as the plasticizer, there was vigorous evolution of hydrogen sulfide during blending. However, with the combination of an aliphatic polysulfide and a syrene polysulfide, as the plasticizer, only a small amount of hydrogen sulfide was liberated. After standing at least 18 hours at room temperature, each sample was heated in an oil bath at 170° C. for 2 hours. At the end of the heating period the samples were cast in 30-g. portions in aluminum foil moisture dishes 60 mm. in diameter and 15 mm. deep. After the samples had cured for 7 days at room temperature, the Shore "B" hardness, color, and impact strength were determined. The results are summarized in Table V.

cized sulfur composition prepared above prior to the incoropraton of the Celite and Aroclor substances, each sample being cast in the manner described above. The results, summarized in the following table, show that the compositions containing the Celite and Aroclor substances have much greater impact strength and whiteness than do the controls, the hardness remaining at a suitable level.

TABLE V

| Plasticizer | Weight of Plasticizer, g. | Weight of Sulfur, g. | Shore B Hardness [a] | Munsell Color [b] | Impact Strength, in.[c] |
|---|---|---|---|---|---|
| Aliphatic polysulfide and styrene polysulfide | 100[d] | 895 | 90 | 10Y-8/8 | 11 |
| 1,2-ethanedithiol[e] | 100 | 929 | 88 | 7Y-8/7 | 18 |
| Do.[e] | 50 | 930 | 93 | 7.5Y-8/5 | 9 |
| 1,2-propanedithiol | 100 | 922.6 | 91 | 7.5YR-7/10 | 13 |

[a] ASTM D1706-61. Shore durometer, type B, The Shore Instrument and Manufacturing Co., Inc., Bulletin R-12 (no date given).
[b] Munsell Book of Color," Munsell Color Co., Baltimore, Md. (1929).
[c] Minimum height from which a 28.1 -g. steel ball had to be dropped to break the 30 -g. sample disc.
[d] Comprised 50 g. of Thiokol LP-3 and 50 g. of Thiokol ZM-399.
[e] Purity was 90–95 percent.

Thus, the impact strength of the plasticized products prepared through the use of 100 g. of 1,2-ethanedithiol or 100 g. of 1,2-propanedithiol was higher than that of the plasticized product obtained through the use of 100 g. of the combination of an aliphatic polysulfide and a styrene polysulfide, and 50 g. of 1,2-ethanedithiol gave a product having an impact strength only slightly lower than that of the product obtained through the use of 100 g. of the Thiokol plasticizers. The hardness of the various plasticized products did not differ greatly. The color of each of the products was sufficiently light to permit the use of pigments in paint formulations.

While the examples herein illustrate one method for achieving plastication of the sulfur, often it is advantageous to first plasticize only a portion of the sulfur, the remainder of the sulfur, as well as the other desired constituents, being added subsequently.

EXAMPLE VI

A crude mixture of 3 - (2 - mercaptoethyl)cyclohexanethiol and 4 - (2 - mercaptoethyl)cyclohexanethiol was prepared by the method of Example I in U.S. 3,050,452.

Samples of a plasticized sulfur composition were prepared by heating a mixture of 913.4 g. of sulfur, 100 g. of crude 3(and 4)-(2-mercaptoethyl)cyclohexanethiol, and 5 g. of calcium carbonate in an oil bath at 160–170° C. for 3 to 4 hours. There was vigorous evolution of hydrogen sulfide during the first hour of the heating period. To each of a series of 90-g. portions of the resulting plasticized sulfur in an oil bath at 160–170° C. was added, with stirring, 9.0 g. of Celite analytical filter aid (diatomite), resulting in an increase in viscosity of the molten plasticized sulfur. The pigmented plasticized sulfur was then stirred at 160–170° C. for 15 minutes, after which 9.0 g. of one of several Aroclor substances (chlorinated polyphenyls) was added to reduce the viscosity to a resonable level. The resulting compositions were stirred at 160–170° C. for 15 minutes and then cast as 30-g. portions, in the form of disc 60 mm. in diameter, by pouring into aluminum foil moisture dishes. After the cast samples had aged at room temperature for 7 days, the impact strength, hardness, and color were determined. For purposes of comparison these properties were also determined for elemental sulfur alone and for the plasti-

| Sample No. | Aroclor Used | Impact Strength, in.[a] | Shore "B" Hardness[b] | Munsell Color[c] |
|---|---|---|---|---|
| Control[d] | None | <4 | 92 | 7.5Y-8/10. |
| Do.[e] | do | 7 | 90 | 2.5GY-8/5. |
| 1 | Aroclor 1232[f] | 41 | 85 | 10Y-8/2. |
| 2 | Aroclor 1242[g] | 33 | 82 | 10Y-8/2. |
| 3 | Aroclor 1254[h] | 36 | 86 | 10Y-8/3. |
| 4 | Aroclor 5460[i] | 11 | 93 | 10Y-8/2. |

[a] Minimum height from which a 28.1 -g. steel ball had to be dropped to break the 30 -g. sample disc.
[b] ASTM D1706-61. Shore durometer, type B. The Shore Instrument and Manufacturing Co., Inc., Bulletin R-12 (no date given).
[c] "Munsell Book of Color," Munsell Color Co., Baltimore, Md. (1929).
[d] Elemental sulfur only.
[e] Plasticized sulfur in the absence of Celite and Aroclor.
[f] Chlorinated biphenyl containing approximately 32 weight percent chlorine.
[g] Chlorinated biphenyl containing approximately 42 weight percent chlorine.
[h] Chlorinated biphenyl containing approximately 54 weight percent chlorine.
[i] Chlorinated terphenyls containing approximately 60 weight percent chlorine.

EXAMPLE VII

A plasticized composition was prepared from sulfur and crude 3(and 4) - (2-mercaptoethyl)cyclohexanethiol as in Example VI except that no calcium carbonate was employed. The resulting product had a viscosity of 290 centipoises at about 165° C. A portion of this product was cast in the manner described in Example VI and then allowed to age for 7 days. The properties of the aged composition, determined as in Example VI, were as follows:

Impact strength, in. _____ 6
Shore "B" hardness _____ 87
Munsell color _____ 2.5GY-8/6

To 894 g. of the plasticized sulfur composition above was added 89.4 g. of Celite analytical filter aid, and the resulting mixture was stirred for 1 hour at 160–170° C. to give a product having a viscosity of 4800 centipoises at about 165° C. Then 89.4 g. of Aroclor 1254 was added, and the mixture was stirred at 160–170° C. for 1 hour, giving a product having a viscosity of 710 centipoises at about 165° C. The further addition of 22.7 g. of Aroclor 1254, followed by stirring at 160–170° C. for 1 hour, reduced the viscosity of the product to 422 centipoises at about 165° C. The final product, after aging for 7 days, had the following properties, determined by the procedure used in Example VI.

Impact strength, in. _____ 28
Shore "B" hardness _____ 80
Munsell color _____ 2.5GY-8/3

Thus, in obtaining the increased impact strength and the whitening of the product by use of the Celite and Aroclor substances, the Aroclor served the very important function of reducing the viscosity of the pigmented molten composition, the hardness of the product remaining at a suitable level.

In another experiment it was observed that the addition of an Aroclor to a plasticized sulfur composition containing no Celite did not significantly whiten the product or improve its impact strength, essentially serving only to reduce the viscosity of the molten composition.

EXAMPLE VIII

A plasticized sulfur composition was prepared from sulfur and crude 3(and 4)-(2-mercaptoethyl)cyclohexanethiol as in Example VI. To 90 g. of the plasticized sulfur were added 9 g. of titanium dioxide and 9 g. of Aroclor 1254, and the resulting mixture was stirred at 160–170° C. for 30 minutes. The product was cast in the manner described in Example VI and then allowed to age for 7 days. The properties of the aged composition, determined as in Example VI, were as follows:

Impact strength, in. _____ 16
Shore "B" hardness _____ 83
Munsell color _____ 7.5Y–8.4

Thus, the impact strength was inferior to that obtained with Celite and Aroclor 1254 in Example VI, and the color was unacceptable. Therefore, titanium dioxide is not a suitable substitute for Celite in the process of this invention.

EXAMPLE IX

In a 1-liter beaker equipped with a stirrer and immersed in an oil bath having a temperature of 170° C. were mixed 256 grams of sulfur and 505 grams of crude 3(and 4)-(2-mercaptoethyl)cyclohexanethiol. Hydrogen sulfide was evolved when the reaction solution reached a temperature of 150° C. At the end of a 4-hour reaction period essentially no more gas was being liberated. The resulting plasticized sulfur was a clear viscous liquid while hot and on cooling to room temperature became a semi-solid.

To a 1-liter beaker equipped with a stirrer and immersed in an oil bath at 170° C. were charged 645 grams of sulfur and 105 grams of plasticizer (as prepared above). After being stirred for 1.5 hours, the mixture had a viscosity of 510 centipoises. The mixture was then transferred to a heated paint sprayer having a pot temperature of 300° F. and then sprayed onto a concrete block. The material began to set in 5 minutes and was completely set in 19 minutes. After pouring three 30-gram discs for impact strength and hardness determination, 61.7 grams of calcined pearlite was added to 617 grams of the remaining material, and the mixture was then heated with stiring at 170° C. to obtain a homogeneous mixture. The resulting mixture having a viscosity of 6800 centipoises was too viscous to spray. Chlorinated biphenyl (Aroclor 1232; 77.1 g.) was added, and the mixture thereof after stirring exhibited a viscosity of 450 centipoises. Upon spraying the material on concrete as above from a heated paint sprayer, initial set occurred in 0.2 minute and complete set occurred in 2.5 minutes. After seven days, the falling ball impact strength and Shore "B" hardness were determined. The data are summarized below:

The above data clearly demonstrate that proceeding in accordance with this invention there is provided a suitable marking composition which has an unexpectedly short set time. Set time is important in highway marking material since it is necessary to preclude traffic on the marked area until the marking material is set or dry. By utilizing the instant invention, the necessity of precluding traffic for a period of time is significantly reduced.

EXAMPLE X

A plasticized sulfur composition was prepared by heating a mixtrue of 256 g. of sulfur and 505.2 g. of crude 3(and 4)-(2-mercaptoethyl)cyclohexanethiol at about 170° C. for 3.5 hours. Then a mixture of 140 g. of the plasticized sulfur composition, 860 g. of sulfur, 200 g. of Icecap K (calcined aluminum silicate from Burgess Pigment Company), and 150 g. of Aroclor 1254 was heated at 160–170° C. for 1 hour. The viscosity of the resulting product was 420 centipoises at about 160° C. After aging for 7 days, the product had the following properties, determined by the procedure used in Example VI.

Impact strength, in. _____ 18
Shore "B" hardness _____ 85
Munsell color _____ 10Y–8/3

A mixture of 70 g. of the above nonpigmented sulfur composition, 430 g. of sulfur, 100 g. of Silver Bond B (crystalline silica from Tamms Industries Company), and 50 g. of Aroclor 1254 was heated at 160–170° C. for 1 hour, giving a product having a viscosity of 282 centipoises at about 160° C. After aging for 7 days, this product had the following properties, determined by the procedure used in Example VI.

Impact strength, in. _____ 83
Shore "B" hardness _____ 84
Munsell color _____ 10Y–8/3

Thus, sulfur-based marking compositions have desirable properties can be made through the use of either calcined aluminum silicate or crystalline silica, as well as through the use of diatomite.

In some cases it is advantageous to heat only a portion of the sulfur with the dithiol, dilute the resulting plasticizer with the halogenated polyphenyl, and then blend this solution with powdered sulfur and pigment to obtain the product as a dry powder.

Reasonable variations and modifications are possible within the scope of this disclosure without departing from the spirit and scope of the invention.

I claim:

1. A plasticized sulfur composition which is formed by reacting elemental sulfur in the presence of a basic catalyst at a temperature in the range of —20 to 250° C. with from 3 to 30 parts by weight of at least one polythiol per 100 parts by weight of sulfur, said polythiol being selected from the group consisting of 1,2-ethanedithiol,
1,2-propanedithiol,
1,3-propanedithiol,
1,2,3-propanetrithiol,
1,2-butanedithiol,
2-methyl-1,2-propanedithiol,
1,4-butanedithiol,
1,2,4-butanetrithiol,
1,2,3,4-butanetetrathiol,

TABLE VI

| Run No. | Sulfur, Parts by Wt. | Plasticizer, Parts by Wt. | Diatomite,[a] Parts by Wt. | Aroclor 1232, Parts by Wt. | Viscosity, Centipoises | Shore "B" Hardness[b] | Impact Strength, In.[c] | Set Time (Min.) | |
|---|---|---|---|---|---|---|---|---|---|
| | | | | | | | | Start | Complete |
| 1 | 86 | 14 | | | 510 | 93 | 4 | 5 | 19 |
| 2 | 86 | 14 | 10 | | 6,800 | | | | |
| 3 | 86 | 14 | 10 | 12.5 | 450 | 83 | >74 | 0.2 | 2.5 |

[a] Calcined pearlite.
[b] ASTM D1706-61. Shore durometer, type B.
[c] Minimum height from which a 28.1-g. steel ball had to be dropped to break the 30-g. sample disc.

1,2,3-pentanetrithiol,
1,6-hexanedithiol,
3-methyl-2,3-heptanedithiol,
1,2,10-decanetrithiol,
2-methyl-1,14-tetradecanedithiol,
1,20-eicosanedithiol,
1,30-triacontanedithiol,
3-butene-1,2-dithiol,
2-butene-1,4-dithiol,
2-methyl-3-hexene-1,2,5,6-tetrathiol,
3,6-octadiene-1,2,8-trithiol,
3-hexyne-1,6-dithiol,
1,2-cyclohexanedithiol,
4-(2-mercaptoethyl)cyclohexanethiol,
3-(2-mercaptoethyl)cyclohexanethiol,
4-methyl-1,2,3-cyclopentanetrithiol,
1-cyclopentyl-1,2-ethanedithiol,
4-cyclohexene-1,2-dithiol,
2,5-cyclohexadiene-1,4-dithiol,
5-cyclooctyne-1,2-dithiol,
4-methyl-3-cyclopentene-1,2-dithiol,
1,4-benzenedithiol,
1,2,4-benzenetrithiol,
1,2,4,5-benzenetetrathiol,
toluene-2,4-dithiol,
toluene-α-4-dithiol,
1,4-naphthalenedithiol,
4-hydroxy-1,2,3-butanetrithiol,
3-acetoxy-1,2-propanedithiol,
2-formyl-1,2-ethanedithiol,
3-acetyl-1,2-propanedithiol,
bis(2-mercaptoethyl)ether,
bis(3-mercaptopropyl)ether,
1,2-bis(2-mercaptoethoxy)ethane,
2,3-dihydroxy-1,4-butanedithiol,
1,4-dimethoxy-2,3-butanedithiol,
5-hydroxy-3-pentene-1,2-dithiol,
6-propionyloxy-3-hexene-1,2-dithiol,
4-formyl-3-butene-1,2-dithiol,
4-propionyl-3-butene-1,2-dithiol,
bis(3-mercaptopropenyl)ether,
3-hydroxy-4-cyclohexene-1,2-dithiol,
4-methyl-5-acetoxy-3-cyclopentene-1,2-dithiol,
6-formyl-2-cyclohexene-1,4-dithiol,
5-acetyl-3-cyclohexene-1,2-dithiol,
bis(4-mercapto-2-cyclopenten-1-yl)ether,
3-hydroxy-1,2-benzenedithiol,
5-acetoxy-1,2,4-benzenetrithiol,
4-formyl-1,2-benzenedithiol,
2-acetyl-1,4-benzenedithiol,
4-ethoxy-1,2-benzenedithiol,
4,5-dihydroxy-1,2-benzenedithiol,
2-methoxy-5-acetyl-1,4-benzenedithiol,
bis(2-mercaptoethyl)sulfide,
bis(3-mercaptopropyl)sulfide,
2-mercaptoethyl-2,3-dimercaptopropyl)sulfide,
bis(2,3-dimercaptopropyl)sulfide,
4-mercaptobutyl 5-mercaptopentyl sulfide,
3,5-dithiaheptane-1,7-dithiol,
3,6,9-trithiaundecane-1,11-dithiol,
4,8,12,16-tetrathianonadecane-1,19-dithiol,
5,10,15,20-tetrathiatetracosane-1,24-dithiol,
3,6,9,12,15,18,21,24,27,30-decathiadotriacontane-1,32-dithiol,
4,8,12,16,20,24,28,32,36-nonathianonatriacontane-1,39-dithiol,
bis(4-mercapto-2-butenyl)sulfide,
2-mercaptoethyl 4-mercaptocyclohexyl sulfide,
bis(3-mercaptocyclopentyl)sulfide,
bis(4-mercapto-2-cyclohexen-1-yl)sulfide,
bis(4-mercaptophenyl)sulfide,
bis(2-mercapto-p-tolyl)sulfide, and
1,4-bis(4-mercaptophenylthio)benzene.

2. A plasticized sulfur composition according to claim 1 wherein said polythiol comprises a mixture of a trithiol with a dithiol wherein the ratio of said dithiol to said trithiol is in the range of 1:9 to 9:1.

3. A plasticized sulfur composition according to claim 1 wherein said polythiol is composed of a mixture of a tetrathiol with a dithiol and wherein the ratio of said dithiol to said tetrathiol is in the range of 1:9 to 9:1.

4. A plasticized sulfur composition according to claim 1 which forms on reacting elemental sulfur and ethanedithiol present in a ratio of polythiol to sulfur in the range of 3 to 30 parts by weight of polythiol to 100 parts by weight of sulfur at a temperature in the range of −20 to 250° C. in the presence of tributylamine.

5. A plasticized sulfur composition according to claim 1 which forms on reacting elemental sulfur and a polythiol selected from the group consisting of 1,2-ethanedithiol, 1,2-propanedithiol, 3-(2-mercaptoethyl)cyclohexanethiol, 4-(2-mercaptoethyl)-cyclohexanethiol and bis(3-mercaptopropyl)ether in the presence of calcium carbonate.

6. A plasticized sulfur composition according to claim 1 having high tensile strength which forms on reacting elemental sulfur with a polythiol mixture of 1,2-ethanedithiol and 1,2,3-propanetrithiol in the presence of tributylamine.

7. A sulfur-based marking composition possessing a high degree of whiteness and having good impact strength which is formed by admixing from 1 to 50 parts by weight to 100 parts by weight of plasticized sulfur a white extender pigment and from 1 to 50 parts by weight to 100 parts by weight of plasticized sulfur a halogenated polyphenyl with sulfur plasticized at a temperature within the range of 50 to 250° C. with 3 to 30 parts by weight of dithiol to 100 parts by weight of sulfur of at least one dithiol selected from the group consisting of 3-(2-mercaptoethyl)cyclohexanethiol and 4-(2-mercaptoethyl)cyclohexanethiol.

8. A composition according to claim 7 wherein said halogenated polyphenyl is selected from the group consisting of halogenated biphenyl, halogenated o-terphenyl, halogenated m-terphenyl and halogenated p-terphenyl.

9. A sulfur-based marking composition according to claim 7 formed by plasticizing elemental sulfur with a mixture comprising 3-(2-mercaptoethyl)cyclohexanethiol and 4-(2-mercaptoethyl)cyclohexanethiol and thereafter admixing with the resulting plasticized sulfur diatomite and chlorinated biphenyl.

References Cited

UNITED STATES PATENTS

| | | | |
|---|---|---|---|
| 1,761,740 | 6/1930 | Nordlander | 106—70 |
| 2,093,752 | 9/1937 | Duecker | 106—70 |
| 2,142,145 | 1/1939 | Patrick | 260—609 |
| 2,237,625 | 4/1941 | Olin | 260—608 |
| 2,676,165 | 4/1954 | Fettes | 260—79 |
| 2,799,593 | 7/1957 | Seymour | 106—70 |
| 3,038,013 | 6/1962 | Warner | 260—608 |
| 3,342,620 | 9/1967 | Molinet | 106—287 |

FOREIGN PATENTS

| | | |
|---|---|---|
| 1,373,025 | 8/1964 | France. |

JULIUS FROME, *Primary Examiner.*

T. MORRIS, *Assistant Examiner.*

U.S. Cl. X.R.

106—70, 287; 260—609